US009523344B2

(12) United States Patent
Farb et al.

(10) Patent No.: US 9,523,344 B2
(45) Date of Patent: Dec. 20, 2016

(54) HYDROELECTRIC IN-PIPE TURBINE USES

(75) Inventors: Daniel Farb, Beit Shemesh (IL); Joe Van Zwaren, Beit Shemesh (IL); Avner Farkash, Beit Shemesh (IL); Ken Kolman, Beit Shemesh (IL)

(73) Assignee: LEVIATHAN ENERGY HYDROELECTRIC LTD., Beit Shemesh (IL)

(*) Notice: Subject to any disclaimer, the term of this patent is extended or adjusted under 35 U.S.C. 154(b) by 1299 days.

(21) Appl. No.: 13/322,573

(22) PCT Filed: May 26, 2010

(86) PCT No.: PCT/IB2010/052338
§ 371 (c)(1),
(2), (4) Date: Mar. 15, 2012

(87) PCT Pub. No.: WO2010/136979
PCT Pub. Date: Dec. 2, 2010

(65) Prior Publication Data
US 2013/0207390 A1    Aug. 15, 2013

Related U.S. Application Data

(60) Provisional application No. 61/180,949, filed on May 26, 2009, provisional application No. 61/224,925, filed on Jul. 13, 2009.

(51) Int. Cl.
| F02B 63/04 | (2006.01) |
| F03G 7/08  | (2006.01) |
| H02K 7/18  | (2006.01) |
| F03B 13/06 | (2006.01) |
| F03B 13/00 | (2006.01) |

(Continued)

(52) U.S. Cl.
CPC .............. *F03B 13/06* (2013.01); *F03B 13/00* (2013.01); *F03D 9/10* (2016.05); *F05B 2220/20* (2013.01); *F05B 2220/602* (2013.01); *Y02B 10/50* (2013.01); *Y02E 10/72* (2013.01); *Y02E 60/17* (2013.01)

(58) Field of Classification Search
USPC .. 290/1 R, 43, 52, 54; 60/398, 698; 415/202
See application file for complete search history.

(56) References Cited

U.S. PATENT DOCUMENTS 512,352 A * 1/1894 Zwiebel ................. F01B 17/02
                                                        185/4
970,796 A * 9/1910 Clark .................... F03B 13/142
                                                        415/92

(Continued)

FOREIGN PATENT DOCUMENTS

WO    WO 2007005885 A2 *  1/2007  ............. G05B 15/02

*Primary Examiner* — Pedro J Cuevas
(74) *Attorney, Agent, or Firm* — Mark M. Friedman

(57) ABSTRACT

An in-pipe turbine has uses in energy storage and circulation. Specific applications are in storage systems working by elevation, smart grid systems, pressure release, and heating/cooling systems. Storage and release of electrical energy are important parts of an electrical grid. A system for storage using particulates is presented. On a higher level, a water system can interact with an electrical grid in order to use and provide electricity and convey water in a more efficient manner. The connection of a smart water and smart electrical grid, which may include the use of an in-pipe hydroelectric turbine, is presented.

1 Claim, 4 Drawing Sheets

(51) Int. Cl.
*F03B 13/10* (2006.01)
*F01D 15/10* (2006.01)

(56) References Cited

U.S. PATENT DOCUMENTS

| | | | | |
|---|---|---|---|---|
| 1,010,609 A * | 12/1911 | Fountain | E02B 9/00 | 405/75 |
| 2,487,947 A * | 11/1949 | Senn | F16J 3/02 | 60/528 |
| 2,962,599 A * | 11/1960 | Pirkey | E02B 9/00 | 290/4 R |
| 3,306,218 A * | 2/1967 | Reeves | B65G 15/42 | 198/547 |
| 4,057,736 A * | 11/1977 | Jeppson | F01K 13/00 | 290/1 R |
| 4,122,381 A * | 10/1978 | Sturm | H02J 7/34 | 290/52 |
| 4,134,024 A * | 1/1979 | Wiseman | E21B 36/04 | 166/65.1 |
| 4,201,059 A * | 5/1980 | Feder | F03G 3/04 | 185/33 |
| 4,208,873 A * | 6/1980 | Foglia | F03D 1/04 | 290/54 |
| 4,272,686 A * | 6/1981 | Suzuki | F03B 17/062 | 290/43 |
| 4,352,025 A * | 9/1982 | Troyen | F03B 13/00 | 290/54 |
| 4,403,154 A * | 9/1983 | Reale | F03B 17/00 | 290/53 |
| 4,443,707 A * | 4/1984 | Scieri | F03B 13/06 | 290/4 A |
| 4,488,055 A * | 12/1984 | Toyama | F03B 13/08 | 290/42 |
| 4,496,845 A * | 1/1985 | Ensign | F03B 15/12 | 290/43 |
| 4,531,877 A * | 7/1985 | Carroll | B65G 67/46 | 414/372 |
| 4,531,888 A * | 7/1985 | Buchelt | F03B 3/04 | 415/148 |
| 4,698,516 A * | 10/1987 | Thompson | F03B 13/06 | 290/54 |
| 4,731,545 A * | 3/1988 | Lerner | H02K 7/1823 | 290/43 |
| 4,740,711 A * | 4/1988 | Sato | F01B 13/061 | 290/52 |
| 4,742,457 A * | 5/1988 | Leon | G06Q 40/00 | 235/379 |
| 4,873,830 A * | 10/1989 | Blattler | F16K 31/02 | 137/341 |
| 4,918,369 A * | 4/1990 | Solorow | F03B 17/00 | 290/54 |
| 4,923,368 A * | 5/1990 | Martin | F03B 7/00 | 415/202 |
| 5,007,241 A * | 4/1991 | Saitou | F03B 17/00 | 415/62 |
| 5,043,592 A * | 8/1991 | Hochstrasser | F03B 13/00 | 290/52 |
| 5,362,987 A * | 11/1994 | Cassaday | F15C 1/22 | 137/826 |
| 5,755,553 A * | 5/1998 | Laemthongsawad | F03B 7/003 | 290/54 |
| 5,863,188 A * | 1/1999 | Dosman | F01D 15/08 | 417/391 |
| 6,023,986 A * | 2/2000 | Smith | G01C 7/06 | 324/220 |
| 6,194,191 B1 * | 2/2001 | Zhang | C07K 14/4746 | 424/199.1 |
| 6,194,815 B1 * | 2/2001 | Carroll | H02N 2/18 | 310/339 |
| 6,309,179 B1 * | 10/2001 | Holden | F03B 1/04 | 290/54 |
| 6,509,652 B2 * | 1/2003 | Yumita | F03B 13/00 | 290/54 |
| 6,800,951 B2 * | 10/2004 | Jefferson | F01K 3/16 | 165/DIG. 9 |
| 6,861,766 B2 * | 3/2005 | Rembert | F03D 9/023 | 290/43 |
| 6,981,376 B2 * | 1/2006 | Dutta | F03B 17/005 | 290/54 |
| 7,466,035 B1 * | 12/2008 | Srybnik | F03B 17/063 | 290/43 |
| 7,564,144 B1 * | 7/2009 | Srybnik | F03B 13/00 | 290/43 |
| 8,058,741 B1 * | 11/2011 | Echemendia | F03B 7/00 | 290/53 |
| 8,307,640 B1 * | 11/2012 | Callen | F03B 17/005 | 290/43 |
| 2001/0022085 A1 * | 9/2001 | Stewart | F03G 7/04 | 60/641.2 |
| 2002/0096887 A1 * | 7/2002 | Schultz | E21B 28/00 | 290/54 |
| 2002/0180216 A1 * | 12/2002 | McDavid, Jr. | F03D 1/04 | 290/54 |
| 2003/0218338 A1 * | 11/2003 | O'Sullivan | F03B 15/06 | 290/43 |
| 2008/0169654 A1 * | 7/2008 | Omer | F03B 7/003 | 290/4 R |
| 2011/0204627 A1 * | 8/2011 | Ho | F03B 17/005 | 290/43 |
| 2015/0198057 A1 * | 7/2015 | Hanna | F01D 15/10 | 290/52 |
| 2015/0198138 A1 * | 7/2015 | Hanna | F03B 13/10 | 290/52 |

\* cited by examiner

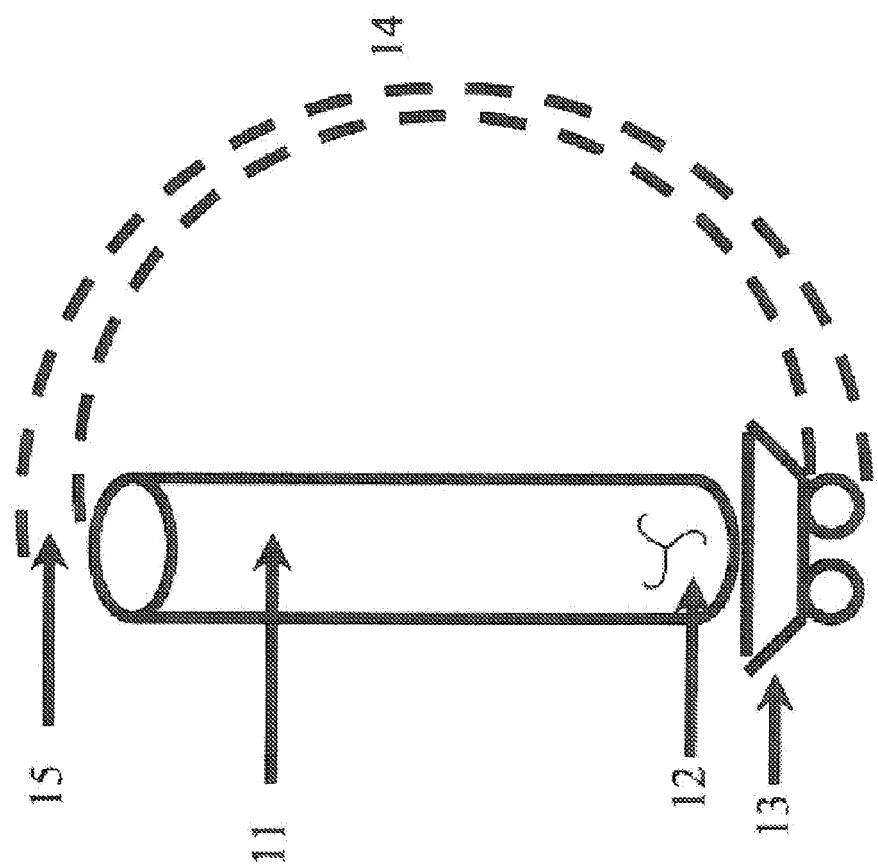

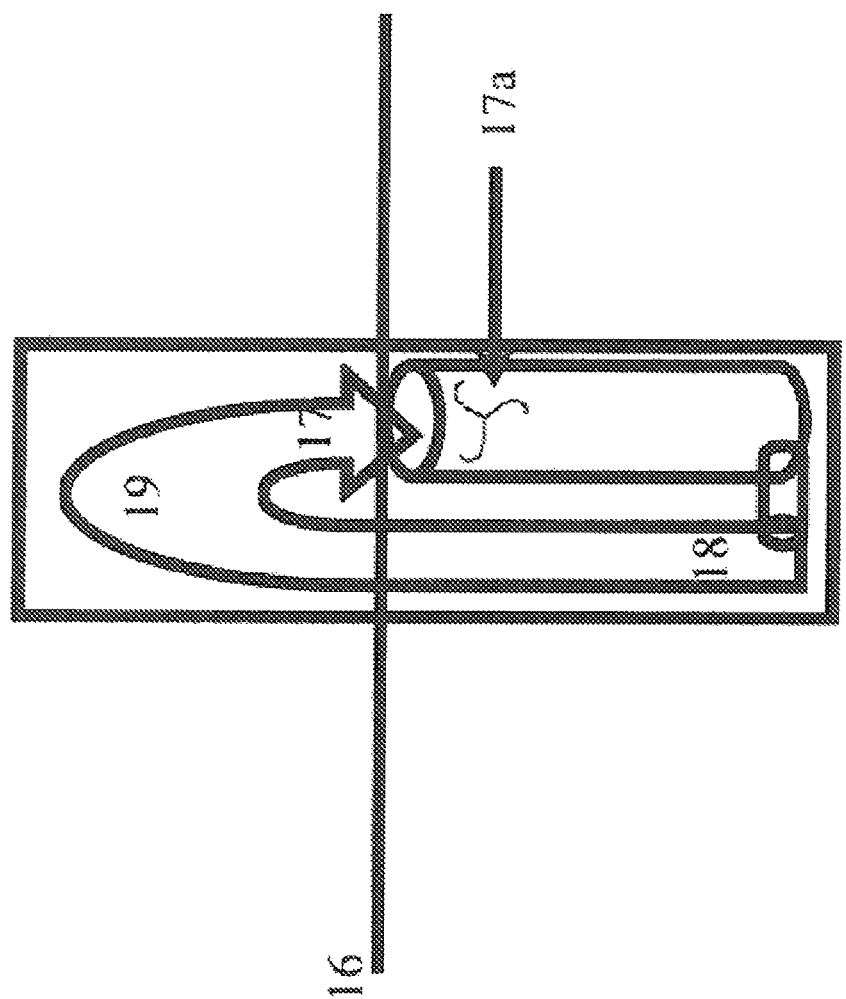

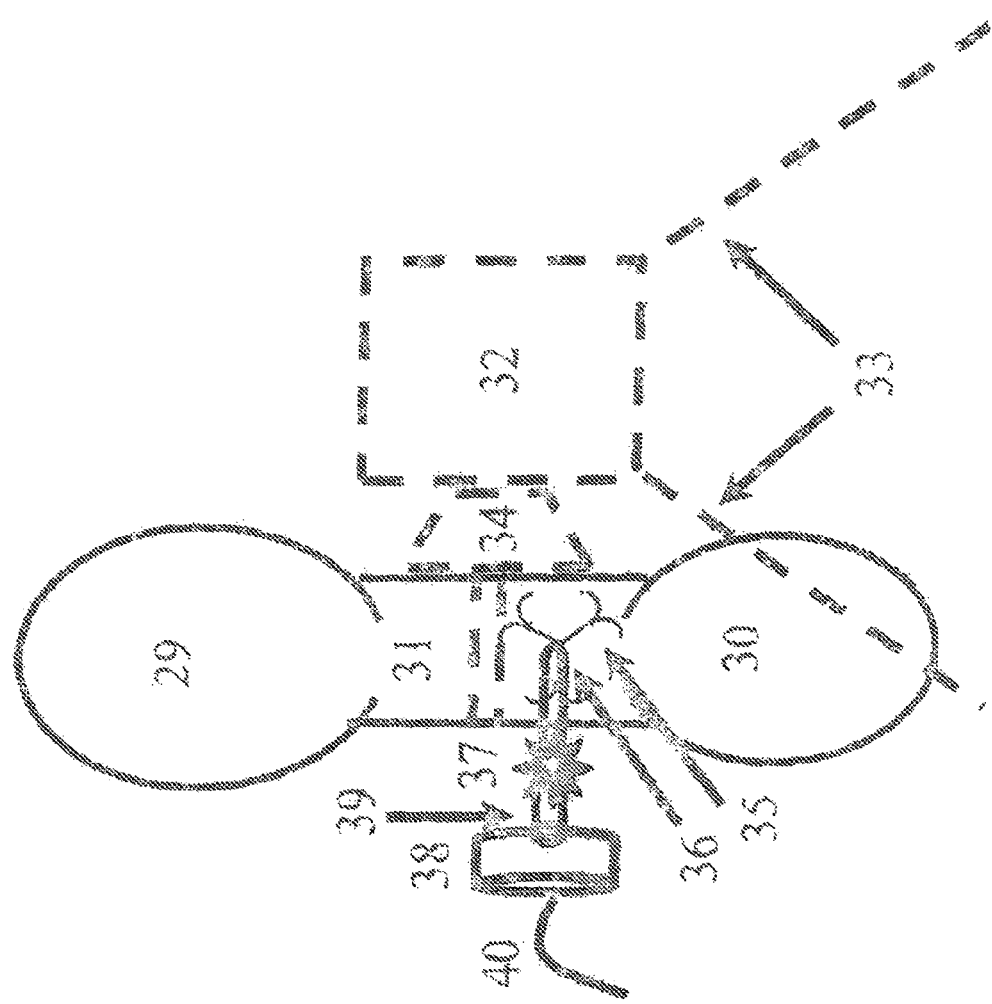

HYDROELECTRIC IN-PIPE TURBINE USES

CROSS REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

This patent application claims the benefit of U.S. Provisional Patent Application No. 61/180,949, named PROVISIONAL 5-09: RENEWABLE ENERGY INVENTIONS, filed May 26, 2009 and U.S. Provisional Patent Application No. 61/223,925, named Provisional 7-09 Renewable Energy Inventions, filed Jul. 13, 2009.

BACKGROUND OF THE INVENTION

The present invention relates to ways in which an in-pipe turbine can have new uses, particularly with storage and circulation of energy. They all have a unified connection; such a turbine is an excellent means for working with water and electrical systems individually and separately. These uses will be described in the patent application.

Related art: Not applicable.

BRIEF DESCRIPTION OF SEVERAL VIEWS OF THE DRAWINGS

The invention is herein described, by way of example only, with reference to the accompanying drawings, wherein:

FIG. 2 is a diagram of a conveyor belt-like storage system.

FIG. 3 is a diagram of a thermosyphon.

FIG. 4 is a diagram of a different cross-sectional view of an hourglass-like storage system.

DETAILED DESCRIPTION OF THE INVENTION

Figure 1:
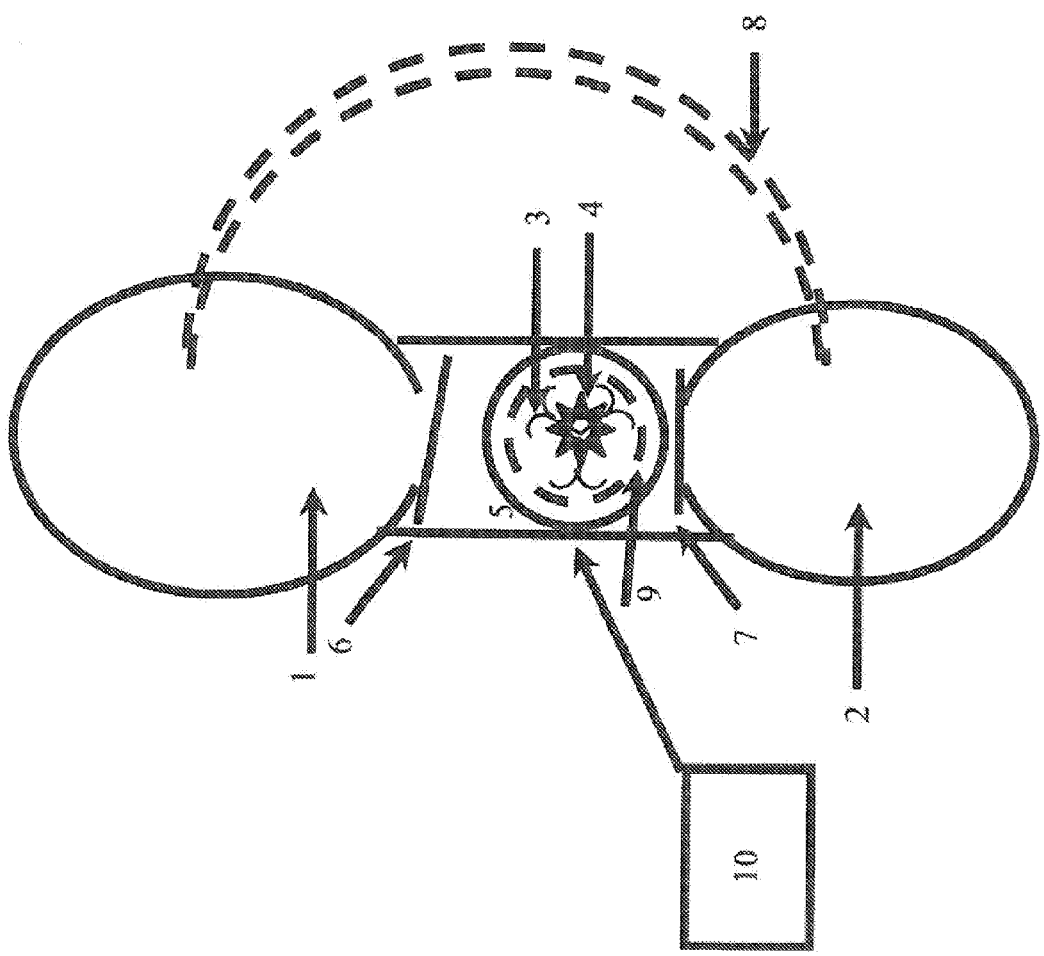
FIG. 1 is a cross-sectional diagram of an hourglass-like storage system.

The present invention relates to the uses and applications of an in-pipe turbine in fluid systems.

Definitions: The current patent application deals with fluids. Unless otherwise stated, it refers to any kind of fluid: water, oil, gas, etc.

The principles and operation of an in-pipe turbine within a fluid system according to the present invention may be better understood with reference to the drawings and the accompanying description.

Referring now to the drawings, FIG. 1 illustrates an hourglass-like storage system. Here is presented the system of elevating a substance, particularly a solid, for the purpose of storing energy. The ideal substance would be sand, and, in one embodiment, the structure would be like an hourglass with two storage containers (1, 2) with at least one turbine (3) in the middle. Two in-pipe turbines could be used in series for higher efficiency. In another embodiment, said turbine would have a bidirectional input and unidirectional output gear (4) attached to the generator (5) so that the generator can generate energy from both sides of the "hourglass." At least one gating structure (6, 7) to open and close the storage containers for access to the turbine should also be present. The device, when finished discharging energy, would gradually tilt back up as the energy used for storage is produced. A track (8) or a gear (9) in conjunction with a motor would enable incremental return to full storage capacity. Incremental return is important for storing whatever spare energy is present in a system, while continuous production of energy from storage is important for the user. Box (10) represents the electronic control that would receive instructions to store and release electrical energy. The solid or sand can also be wet. Here are some density values:

| Sand, wet | 1922 |
| Sand, wet, packed | 2082 |
| Sand, dry | 1602 |
| Sand, loose | 1442 |
| Sand, rammed | 1682 |
| Sand, water filled | 1922 |
| Sand with Gravel, dry | 1650 |
| Sand with Gravel, wet | 2020 |

An hourglass-type of structure is not the only solution. FIG. 2 illustrates a conveyor system to elevate the substance to the top of a high pipe (11) in such a system. At least one turbine (12) in the pipe or attached to the pipe provides electricity. The substance empties into a conveyor belt of any kind, here represented as a coal-mining cart on wheels (13), which then ascends a track (14). This is representative only. It dumps its load at the top (15) into the pipe or a collector at the top. Gates at a number of spots can regulate the production of electricity, and the conveyor belt can operate little by little as electricity becomes available.

Such systems can operate on or off grid.

Because these systems can be made relatively small and can operate with many different substances, some of which are denser than water, they enable great flexibility for grid control. They can also be used in desert areas. Deserts are defined as areas with an average annual precipitation of less than 250 millimeters (10 in) per year Water systems have a need for many gauges, meters, etc. in order to operate the system. A new use is proposed for an in-pipe turbine—the generation of power for such applications. Any type of off-grid power generation is presented. The use of battery chargers and batteries connected to the generator and the turbine in order to hold electricity in cases of intermittent flow is presented. In addition, these individual uses can be connected to a smart water grid.

An in-pipe turbine has a new use as a pressure reduction valve equivalent to reduce excess pressure in the piping system. Its use in conjunction with a pressure valve to assure a steady input or output of pressure from the combined turbine and pressure valve system is hereby presented.

The method of decreasing the pressure before and after a propeller is hereby claimed, wherein a combination of at least nozzle size, nozzle shape, type (including shape, for example) of blade, and torque/rpm characteristics of the generator system are used to change the pressure precisely from entry to exit.

A new use for the city, utility, etc. sewage or fresh water system can be to hold energy within the system and release the fluids for energy during peak hours or other times of need. A series of in-pipe turbines connected to the electrical grid and the water grid through a microprocessor that also receives data derived from water and electrical sensors enables the interaction of two grids for the purpose of storing excess energy and providing it on demand. Currently, many utilities pump water up at night or at other non-peak times, but the new business method is the release of electricity during peak hours from within the water system, not merely an external storage facility. Use in the water system is defined as use in a location where the water is in conduit to perform the system's customary work of providing water to customers or treating it.

Computerized matching of supply and demand for water in the water system and/or electricity in the electrical system is a new use presented here.

The placement of a turbine in the condensation stage of a thermosyphon, as shown in FIG. 3, or any heating and cooling system, is hereby presented. This could provide a continuous supply of renewable energy from heat exchange. The earth (16) is relatively warm in cold climates at all times, and relatively cool in hot climates by day and warm at night. The level of the turbine (17a) is in one embodiment placed above the level of the fluid (18) which is at the bottom, so that the condensation above it (19) can move downwards (17) through it more easily. The situation can be artificially created, as by placing the system in sand. In the desert, at night, the air cools faster. It should be constructed so that the water in the cooler air condenses over the turbine and drips through it. That may involve selectively insulating the area where the evaporation to gas occurs, and decreasing the insulation (or increasing the circulation of cold air) over where the condensation area occurs.

Heating and cooling systems have a continuous flow of fluid, and the turbine can be placed in the downward conduit.

FIG. 5 is a diagram of an hourglass-like storage system from another perspective to make the structures clearer. Elements (29) and (30) are the containers. Element (31) is a pipe or connector structure. The gates of FIG. 1 are not shown here so that the picture is less cluttered. A motor (32), mounted on a support structure (33), here shown as legs in one embodiment, is fixedly connected to the center of the "hourglass" with element (34), which also shows a customary use of a central shaft, but it need not be done in that manner. The whole motor system is shown in dotted lines to show them clearly as an accompaniment to the motor. The power generation mechanism is shown more clearly in this perspective. The turbine (35) in the pipe is connected via a shaft (36) as is standard in the art to a generator (38) usually via a gear (37). The generator often has its own shaft (39) connected to the gear (37). An electrical wire (40) conveys the electricity from the generator.

While the invention has been described with respect to a limited number of embodiments, it will be appreciated that many variations, modifications and other applications of the invention may be made.

BRIEF SUMMARY OF THE INVENTION

The present invention successfully addresses the shortcomings of the presently known configurations by providing uses for turbines in water systems and water-energy systems.

It is now disclosed for the first time a power storage system, comprising:
a. A mechanism for the elevation of particulate solids,
b. A mechanism for the release of said solids via a turbine to produce electricity.

In one embodiment, the system further comprises:
c. A system of incremental elevation of said solids for small input units of electricity.

According to another embodiment, the system is on grid.
According to another embodiment, the system is off grid.
In one embodiment, the system further comprises:
c. Two containers,
d. At least one turbine connecting them,
e. At least one gate between them.

In one embodiment, the system further comprises:
f. A bidirectional input and unidirectional output gear.

In one embodiment, the system further comprises:
f. A motorized system operative to change the position of the two containers.

In one embodiment, the system further comprises:
c. At least one conveyor,
d. A motorized system for said conveyance,
e. A pipe with an attached turbine.

It is now disclosed for the first time a system for the electronic control of substantially incremental release and storage of energy, comprising:
a. A microprocessor operative to receive data from and send instructions to a storage control system using particulate solids It is now disclosed for the first time a use of a water system as an energy storage platform, wherein energy stored in water elevation and/or pressure in the water system is released when desired through a network of at least one hydroelectric turbine.

It is now disclosed for the first time a microprocessor control system, comprising a microprocessor with memory to which data flows in from both the water grid and the electrical grid simultaneously.

According to another embodiment, data containing control instructions also flows out to the water grid.

It is now disclosed for the first time a business method for the release of energy from storage in a water system during peak hours through turbines.

It is now disclosed for the first time a system for the delivery of water in a water system, comprising a microprocessor performing computerized matching on of supply and demand for water in the water system and/or electricity in the electrical system.

It is now disclosed for the first time a network-controlled system for transferring energy and/or stored energy between a water grid and an electric grid, comprising:
a. Electrical connectors and power lines,
b. Water and electrical measurement devices,
c. Microprocessor control devices,
d. Hydroelectric turbines.

It is now disclosed for the first time a use of an in-pipe turbine to generate electricity for water system functions.

It is now disclosed for the first time a pressure valve system, comprising:
a. A pressure valve operating by electricity,
b. A substantially adjacent source of electricity for said valve.

According to another embodiment, said source is a hydroelectric turbine.

In one embodiment, the system further comprises:

c. Battery chargers and batteries.

It is now disclosed for the first time a use of an in-pipe hydroelectric turbine as a pressure reduction valve equivalent.

According to another embodiment, the turbine blade system is one of cups.

According to another embodiment, the turbine blade system is one of propellers.

It is now disclosed for the first time a pressure control system in a pipe, comprising:

a. An in-pipe turbine, b. A pressure regulation valve directly proximate to said turbine.

It is now disclosed for the first time a thermosyphon, comprising:

a. A turbine in the conduit of the condensation phase.

In one embodiment, the system further comprises:

b. Insulation over the area of evaporation.

It is now disclosed for the first time a heating or cooling system, comprising:

a. An in-pipe turbine in the downward conduit.

What is claimed is:

1. A system for the incremental release and storage of energy, comprising:
   two containers, each container containing particulate solids, each of the containers comprising an opening, the openings facing each other, with one above the other, so that their contents can be discharged into each other,
   a neck intermediate to and in communication with each of said containers,
   at least one turbine extending from the neck so as to produce electrical energy when the particulate solids descend, said turbine operatively coupled to a gear and a generator,
   at least one gate connected to at least one opening and intermediate to the openings of said containers, operative to hold back the particulate solids,
   a motor supplied by an external utility or external grid in communication with the containers and the neck, the motor operative to rotate the containers and exchange the position of the two containers, between upper and lower positions,
   a support structure for mounting the motor, and,
   an electronic control in communication with the motor and the containers, and operative to control the release of particulate solids by opening the at least one gate to produce electricity via the turbine.

* * * * *